United States Patent
Govea et al.

(10) Patent No.: US 12,458,939 B2
(45) Date of Patent: Nov. 4, 2025

(54) CONNECTORS WITH CUTTING ELEMENT

(71) Applicant: MEISSNER FILTRATION PRODUCTS, INC., Camarillo, CA (US)

(72) Inventors: Andrew Govea, Ventura, CA (US); Katherine Conlin, San Luis Obispo, CA (US); Max Blomberg, Templeton, CA (US)

(73) Assignee: Meissner Filtration Products, Inc., Camarillo, CA (US)

( * ) Notice: Subject to any disclaimer, the term of this patent is extended or adjusted under 35 U.S.C. 154(b) by 783 days.

(21) Appl. No.: 17/733,906

(22) Filed: Apr. 29, 2022

(65) Prior Publication Data

US 2022/0250017 A1  Aug. 11, 2022

Related U.S. Application Data

(62) Division of application No. 16/559,467, filed on Sep. 3, 2019, now Pat. No. 11,395,994, which is a division of application No. 15/652,084, filed on Jul. 17, 2017, now abandoned.

(60) Provisional application No. 62/368,892, filed on Jul. 29, 2016.

(51) Int. Cl.
| | | |
|---|---|---|
| *B01F 25/316* | (2022.01) | |
| *B01F 23/50* | (2022.01) | |
| *B01F 25/312* | (2022.01) | |
| *B01F 25/421* | (2022.01) | |
| *B01F 25/4314* | (2022.01) | |
| *B01F 25/53* | (2022.01) | |
| *B01F 35/00* | (2022.01) | |
| *B01F 35/71* | (2022.01) | |
| *B65D 75/70* | (2006.01) | |

(52) U.S. Cl.
CPC ............ *B01F 25/316* (2022.01); *B01F 23/54* (2022.01); *B01F 25/312* (2022.01); *B01F 25/3121* (2022.01); *B01F 25/31243* (2022.01); *B01F 25/4231* (2022.01); *B01F 25/43141* (2022.01); *B01F 25/53* (2022.01); *B01F 35/184* (2022.01); *B01F 35/7137* (2022.01); *B65D 75/70* (2013.01); *B01F 23/565* (2022.01)

(58) Field of Classification Search
CPC ............ B01F 25/3121; B01F 25/31242; B01F 25/3131; B01F 25/316; A01C 23/042; A47L 5/4436; B05B 7/30; B65D 51/2835
See application file for complete search history.

(56) References Cited

U.S. PATENT DOCUMENTS

| | | | | |
|---|---|---|---|---|
| 2,785,012 | A * | 3/1957 | Moreton | B01F 25/316 137/895 |
| 3,833,177 | A * | 9/1974 | Pasley | A01G 25/00 239/207 |
| 4,081,006 | A * | 3/1978 | Crowell | B67B 7/26 141/330 |
| 4,846,403 | A | 7/1989 | Mivelaz | |
| 5,351,859 | A * | 10/1994 | Jansen | B67B 7/28 141/330 |

(Continued)

*Primary Examiner* — Marc C Howell
(74) *Attorney, Agent, or Firm* — Womble Bond Dickinson (US) LLP

(57) ABSTRACT

A connector including a body defining a flange and cutting element sliding between a first position within the body and a second position external of the flange.

23 Claims, 13 Drawing Sheets

(56) References Cited

U.S. PATENT DOCUMENTS

| | | | |
|---|---|---|---|
| 5,688,046 A * | 11/1997 | Triassi | ............... B01F 35/712 366/173.1 |
| 7,767,162 B2 | 8/2010 | Jackson et al. | |
| 2007/0087598 A1 | 4/2007 | Zambaux | |
| 2009/0121040 A1 | 5/2009 | Duncan | |
| 2014/0305315 A1 | 10/2014 | Perentes et al. | |

* cited by examiner

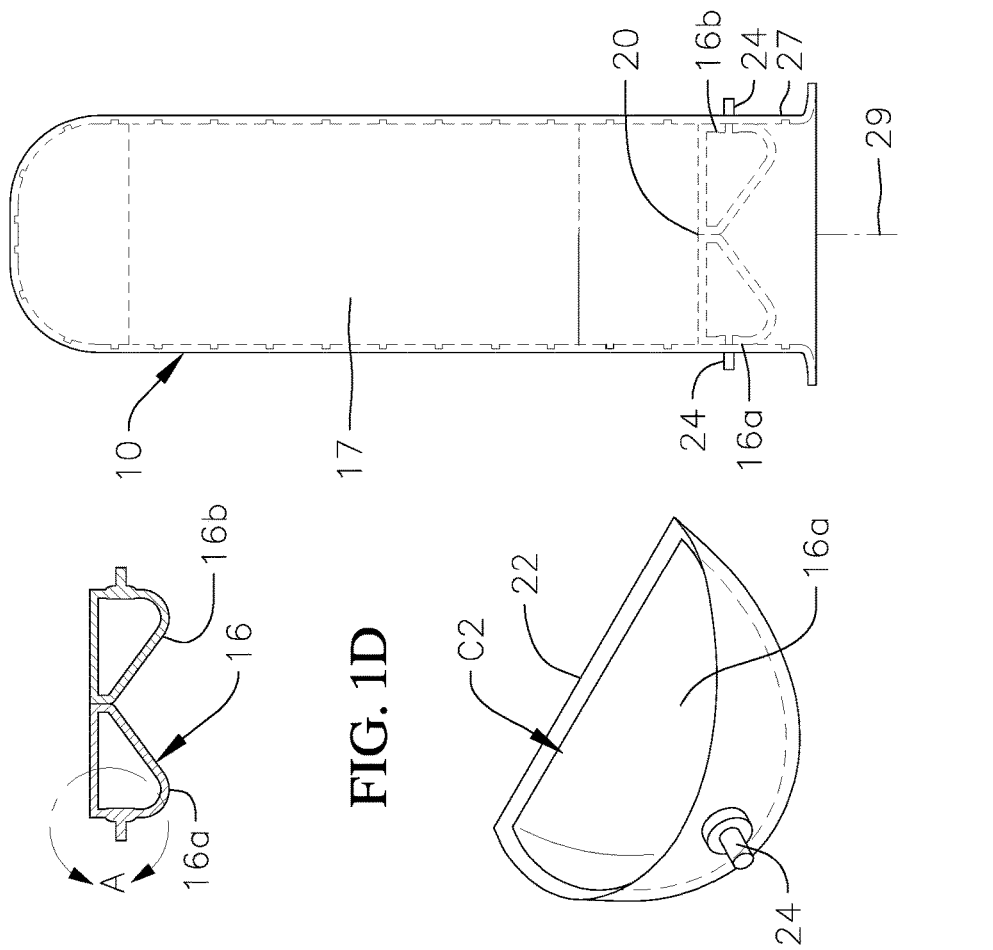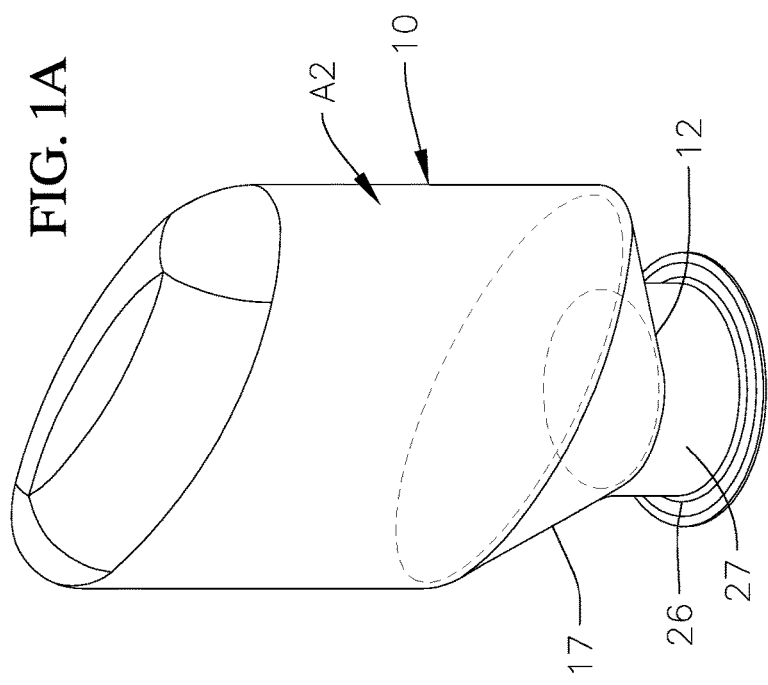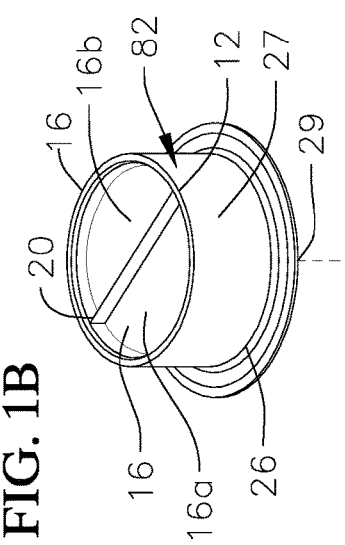

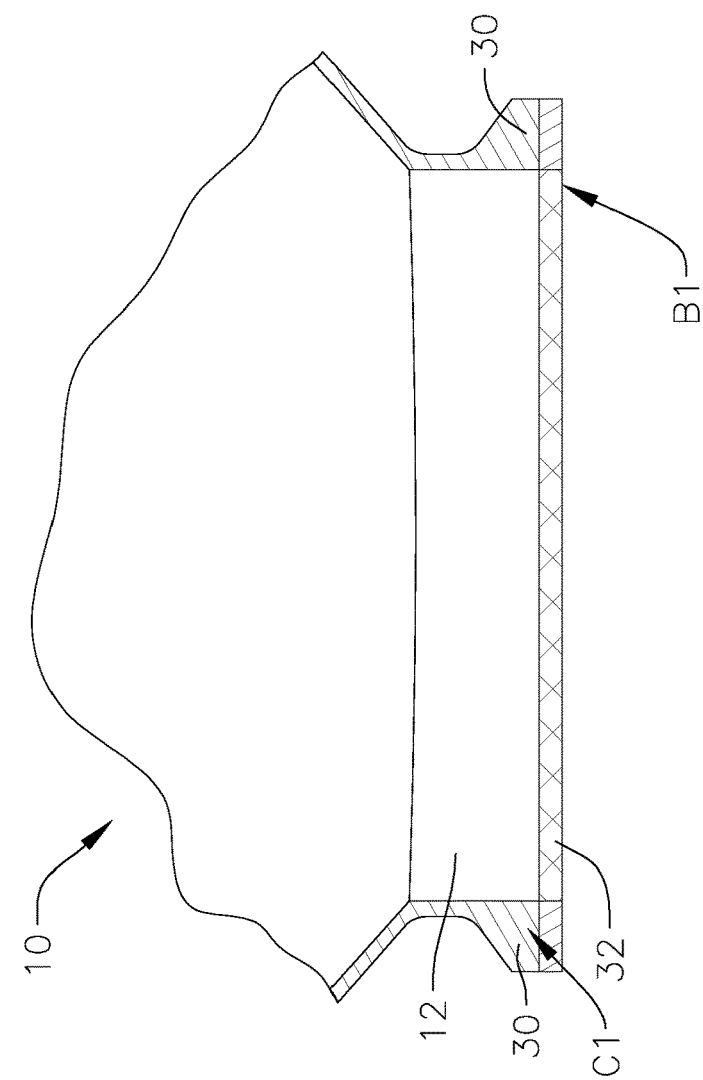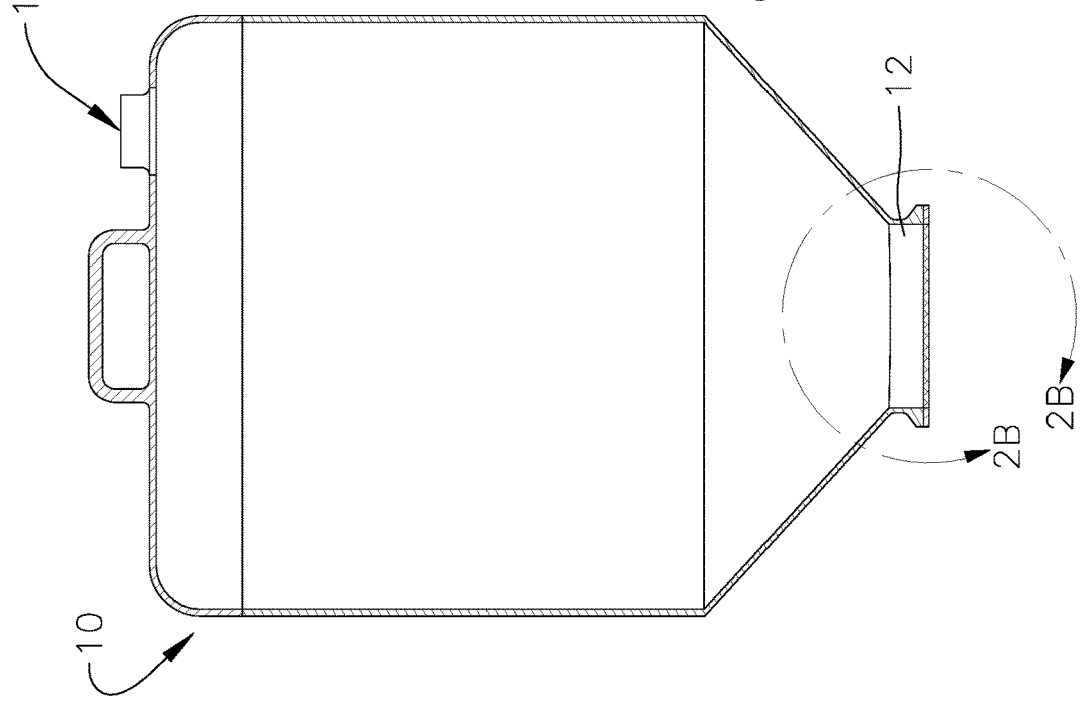

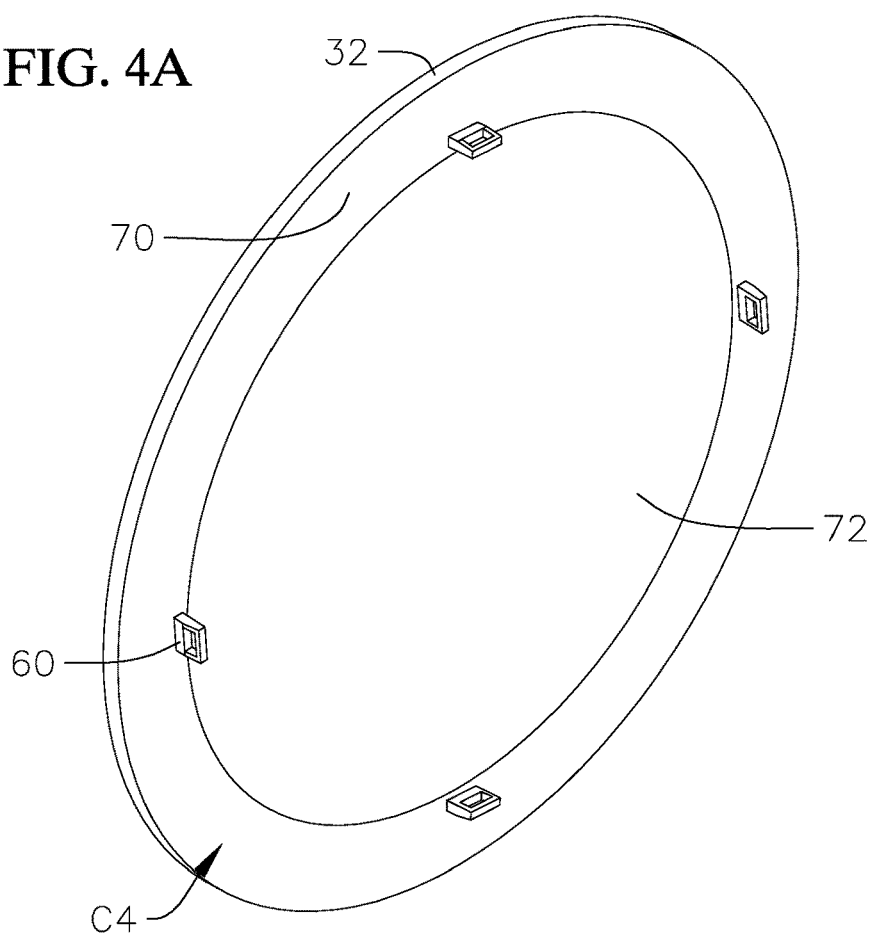
FIG. 4A
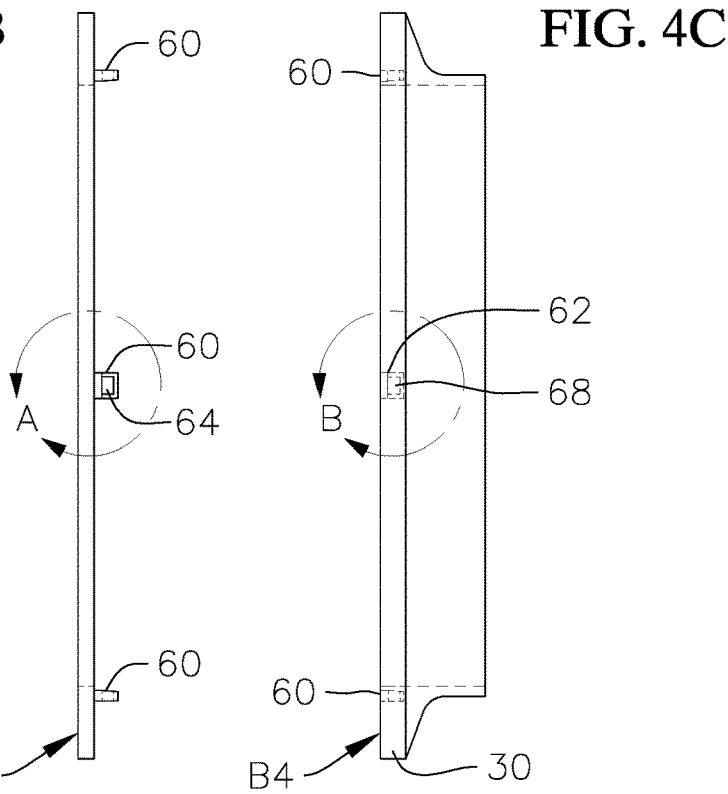
FIG. 4B
FIG. 4C

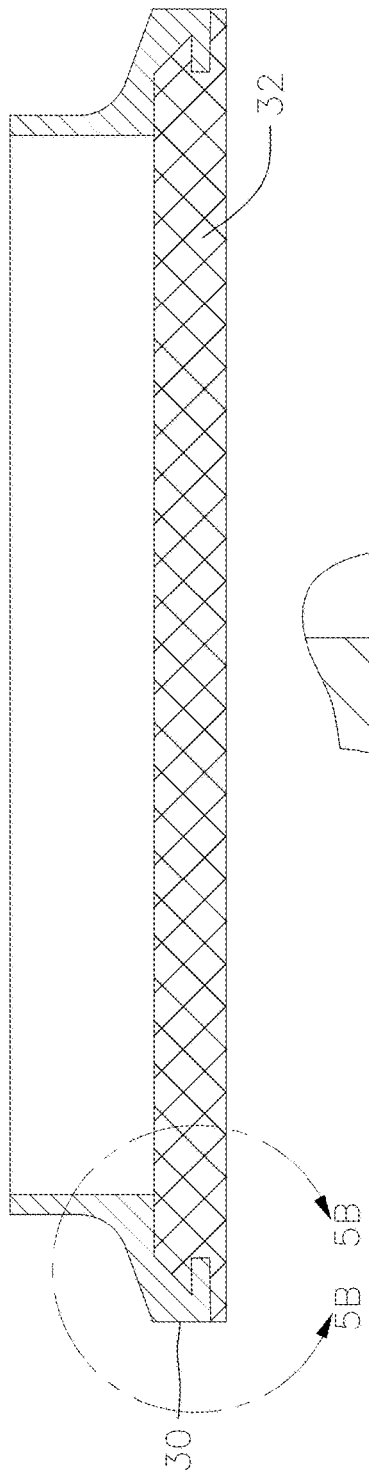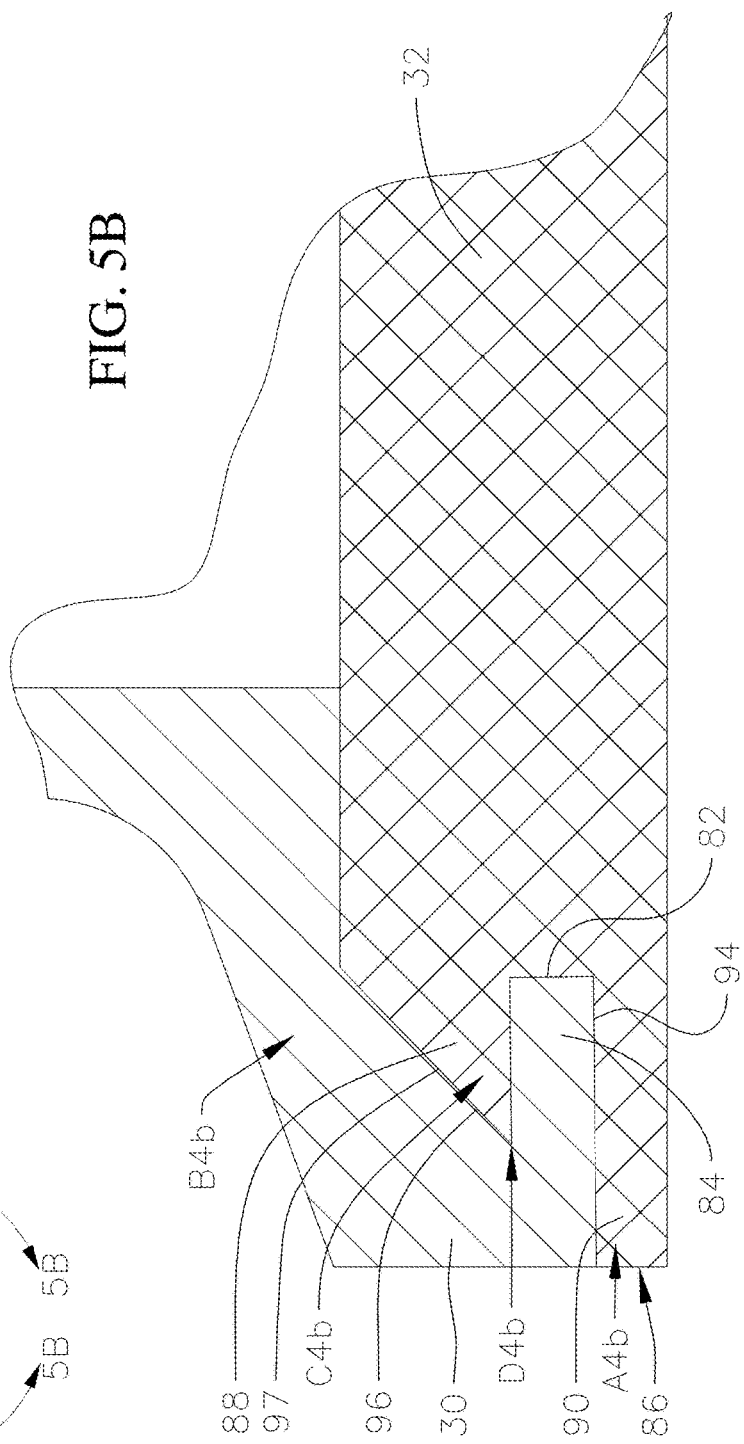

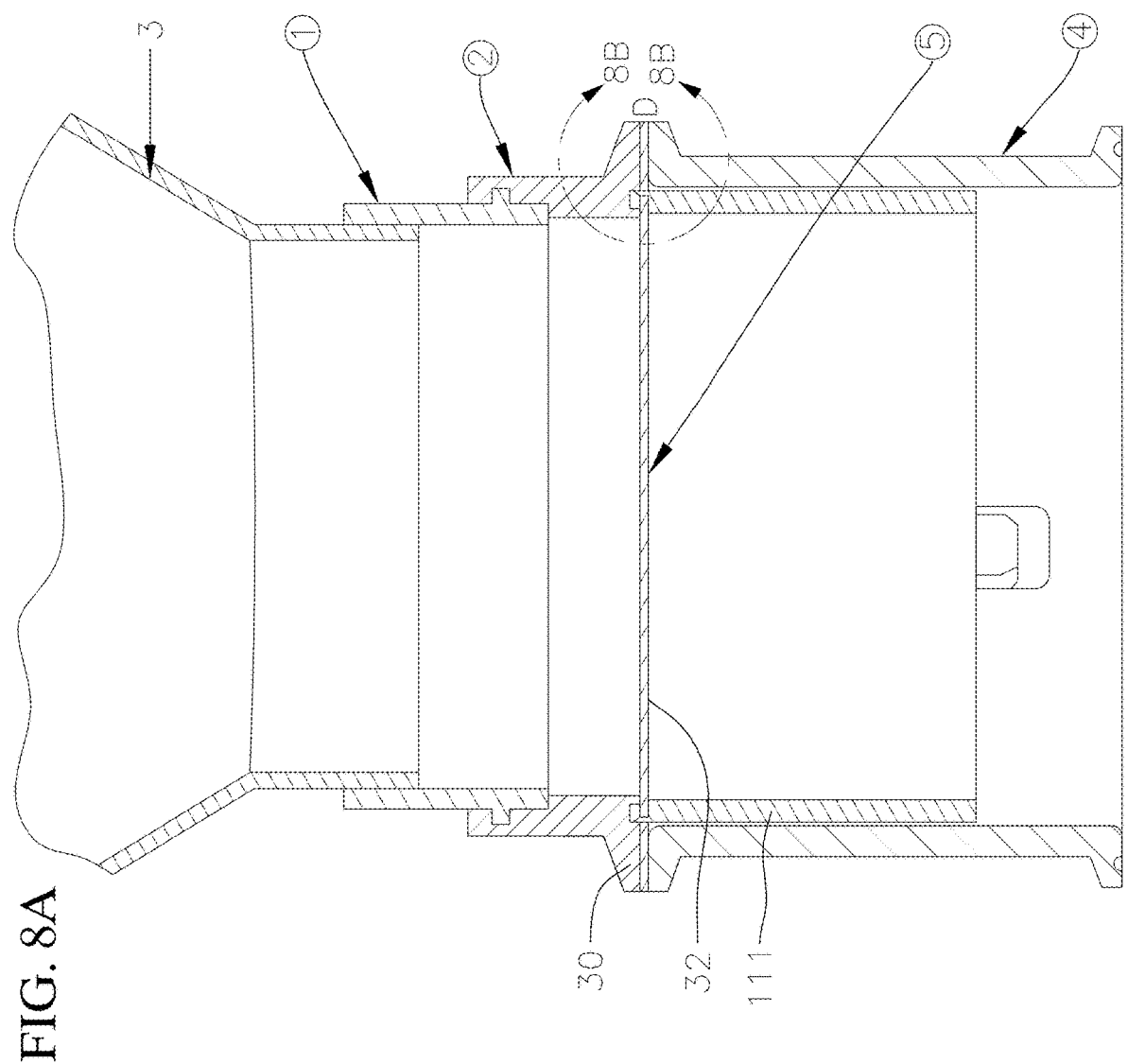

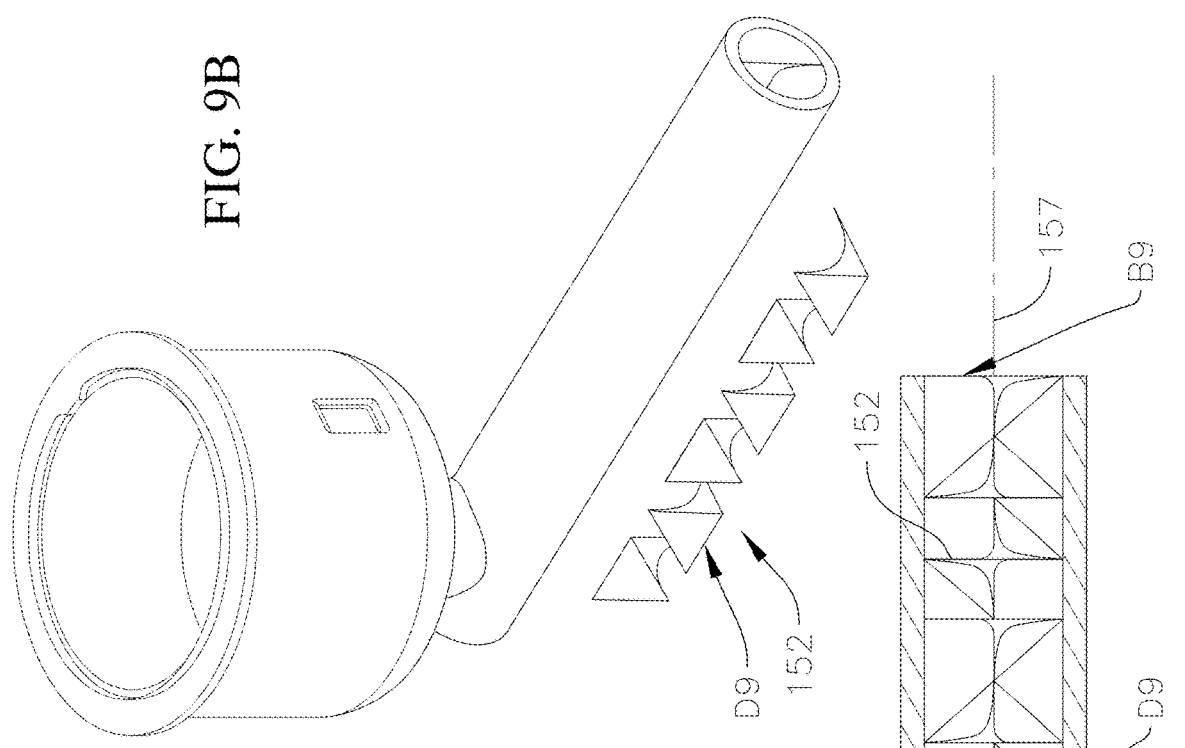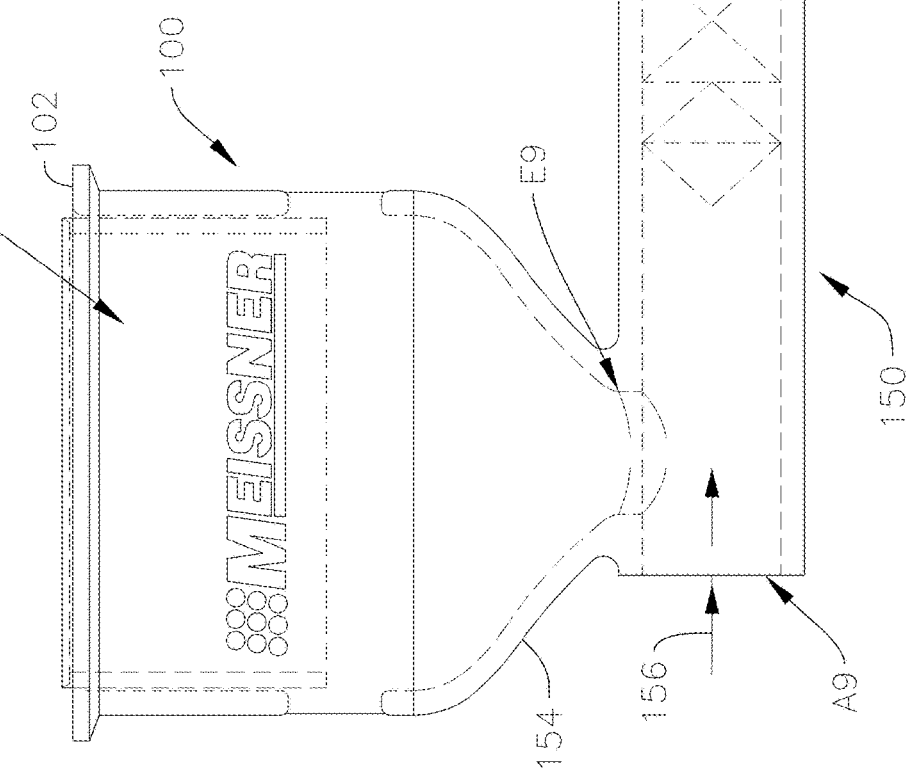

CONNECTORS WITH CUTTING ELEMENT

CROSS-REFERENCE TO RELATED APPLICATIONS

This application is a divisional of U.S. application Ser. No. 16/559,467 filed Sep. 3, 2019, which is a divisional of U.S. application Ser. No. 15/652,084, filed Jul. 17, 2017, now abandoned, which claims the benefit of and priority to U.S. Provisional Application No. 62/368,892, filed Jul. 29, 2016, the entire content of all of which are incorporated herein by reference.

BACKGROUND

Rehydration systems are used to rehydrate powders typically stored in powder transfer bags. The powder transfer bags are filled with powder to be rehydrated and are sealed. To rehydrate the powder, the powder transfer bags are typically unsealed and placed into a rehydration system such that the powder can feed from the powder transfer bag into the rehydration system. This unsealing may make the powder transfer bag and the powder susceptible to contamination. Thus, powder transfer bags and systems that limit, minimize or completely alleviate contamination are desired.

SUMMARY

An example embodiment bag includes a reservoir, a mouth extending from the reservoir, and at least a balloon in the mouth for sealing the mouth. In another example embodiment the at least a balloon is two balloons. In yet another embodiment, the bag also includes a sealing member extending across the mouth, wherein each of the two balloons includes a sealing surface that engages as seals against the sealing member.

In a further example embodiment, the bag includes a reservoir, a mouth extending from the reservoir, and a membrane connected to the mouth, the membrane sealing the mouth. In one example embodiment, an annular flange extends radially outward at a distal end of the mouth, and wherein the membrane is connected to the flange. In a further example embodiment, the membrane includes a plurality of projections and the flange includes a plurality of depressions receiving the plurality of projections for connecting the membrane to the flange. In yet a further example embodiment, the membrane includes an annular section for interfacing with the flange, the annular section surrounding and inner section and being stiffer than the inner section. In another example embodiment, the annular section is thicker than the inner section. In one example embodiment, an annular flange extends radially outward at a distal end of the mouth, and the membrane is welded to the flange. In another example embodiment, an annular flange extends radially outward at a distal end of the mouth, an annular depression extends axially in the flange, and the membrane is connected to the flange at a location radially outward from the annular depression. In yet another example embodiment, the bag further includes a flange member. The flange member includes an annular body and an annular flange extending radially outward from the annular body. The mouth includes an annular wall, the annular body is connected to the annular wall and the membrane is connected to the flange. In a further example embodiment, the bag further includes a projection extending radially outward from the annular wall and a depression extending radially inward into the annular body. The annular body surrounds at least an axial portion of the annular wall and the projection extending from the annular wall is received in the depression extending in the annular body. In yet a further example embodiment, an annular depression extends axially in the flange, and the membrane is connected to the flange at a location radially outward from the annular depression. In one example embodiment, the flange includes a flange surface over which extends the membrane. A first radially extending depression is formed above the flange surface, and the membrane includes a first radially extending projection and a second radially extending projection spaced apart from the first radially extending projection defining a second radially extending depression there-between. The first radially extending projection is received in the first radially extending depression and the second radially extending projection extends over the flange surface. In another example embodiment, In another example embodiment, an annular flange extends radially outward at a distal end of the mouth, and the annular flange includes a flange surface over which extends the membrane. A first radially extending depression is formed above the flange surface, and the membrane includes a first radially extending projection and a second radially extending projection spaced apart from the first radially extending projection defining a second radially extending depression there-between. The first radially extending projection is received in the first radially extending depression and wherein the second radially extending projection extends over the flange surface.

In an example embodiment a connector includes an annular body, a flange extending radially outward from the annular body for coupling with a flange of a bag, and a cutting element within the annular body, the cutting element having a cutting edge, the cutting element being slideable relative to the annular body for moving the cutting edge to a location external of the annular body and beyond the flange. In another example embodiment, the cutting element is an annular member. In yet another example embodiment, the cutting edge is an arcuate member spans a majority of a circumference of the cutting element. In a further example embodiment, the cutting edge when moved to the location external of the annular body and beyond the flange has a height as measured axially from the flange that varies from a highest height to a lowest height. In yet a further example embodiment, the cutting edge extends from a first location to a second location, wherein the height is the highest at the first location and the lowest at the second location. In one example embodiment, the cutting edge extends from a first end to a second end, wherein the cutting edge is curved radially inward at each of the first and second ends.

An example embodiment bag and connector combination includes a bag including, a reservoir, a mouth extending from the reservoir, a mouth flange extending radially outward from a distal end of the mouth, and a membrane over the mouth flange, the membrane sealing the mouth. The combination also includes a connector includes, an annular body, a connector flange extending radially outward from the annular body, the connector flange being coupled to the mouth flange, and the membrane is sandwiched between the mouth flange and the connector flange. The combination also includes a cutting element within the annular body of the connector, the cutting element having a cutting edge, the cutting element being slideable relative to the annular body for moving the cutting edge to a location external of the annular body and beyond the connector flange for cutting the membrane. In another example embodiment, a depression is formed extending axially in the mouth flange for receiving the cutting edge when the cutting edge is moved to the location. In yet another example embodiment, the mouth flange is formed on a flange member coupled to the mouth. In a further example embodiment, the cutting element is an annular member. In yet a further example embodiment, the cutting edge is an arcuate member spanning a majority of a circumference of the cutting element. In an example embodiment, the cutting edge when moved to the location external of the annular body and beyond the flange has a height as measured axially from the flange that varies from a highest height to a lowest height. In another example embodiment, the cutting edge extends from a first location to a second location, and the height is the highest at the first location and the lowest at the second location. In yet another example embodiment, the cutting edge extends from a first end to a second end, and the cutting edge is curved radially inward at each of the first and second ends.

An example embodiment hydration device includes a mixing conduit including an inlet for receiving a hydrating liquid and an outlet, an opening through the conduit for receiving material to be hydrated, and a plurality of obstructions for obstructing flow within the conduit between the inlet and the outlet and downstream of the opening. In an example embodiment, the plurality of obstructions are defined on a mixing element that is within the conduit. In another example embodiment, the hydration device also includes a port extending from the opening through which is received the material to be hydrated. In yet another example embodiment, the hydration device further includes a flow restriction within the conduit defining a flow through opening having an inner surface diameter smaller than an inner surface diameter of the inlet, the flow restriction being downstream of the inlet and upstream of the opening. In a further example embodiment, the flow restriction inner surface diameter is variable. In yet a further example embodiment, the flow restriction is a venturi. In yet a further example embodiment, the port defines a tubular body having a longitudinal axis that is inclined relative to a longitudinal axis of the conduit away from the outlet and toward the inlet. In one example embodiment, the tubular body longitudinal axis is inclined to the longitudinal axis of the conduit at an angle of less than 90 degrees as measured from the longitudinal axis of the conduit to the longitudinal axis of the port. In a further example embodiment, the angle is about 45 degrees.

Another example embodiment hydration system includes a mixing device having an inlet for receiving a liquid and an outlet, a bag holding a material to be hydrated by the liquid coupled to the mixing device, a pump downstream of the mixing device, and a container for receiving the hydrated material downstream of the pump.

A further example embodiment rehydration system includes, a mixing device having an inlet and an outlet, a bag holding a material to be hydrated by a liquid coupled to the mixing device, a pump downstream of the mixing device, and a container for holding a liquid to hydrate the material and for receiving the hydrated material downstream of the pump and for providing at least one of the liquid and the hydrated material to the inlet.

An example embodiment method of hydrating a material includes coupling a bag including the material and being sealed by at least a balloon to a hydrating system, and deflating at least one of the at least a balloon while the bag is coupled to the system allowing the material to be hydrated to flow into the system.

Another example method of hydrating a material includes coupling a bag including the material and being sealed by a membrane to a hydrating system, and cutting the membrane while the bag is coupled to the system allowing the material to be hydrated to flow into the system.

BRIEF DESCRIPTION OF THE DRAWINGS

FIG. 1A is a perspective view of an example embodiment rehydration bag.

FIG. 1B is a perspective view of a mouth of the rehydration bag shown in FIG. 1A.

FIG. 1C is a cross-sectional view of the inflated members used to seal the rehydration bag shown in FIG. 1A.

FIG. 1D is a perspective view of an inflatable member used to seal the rehydration bag shown in FIG. 1A.

FIG. 1E is a cross-sectional view of the rehydration bag shown in FIG. 1A.

FIG. 2A is a plan view of another example embodiment rehydration bag.

FIG. 2B is a partial cross-sectional view of a section of the rehydration bag shown in FIG. 2A around arrows 2B-2B.

FIG. 4A is a perspective view of an example embodiment membrane.

FIG. 4B is an end view of the example embodiment membrane shown in FIG. 4A.

FIG. 4C is an end view of the example embodiment membrane shown in FIG. 4A attached to a flange.

FIG. 5A is a partial cross-sectional view of another example membrane attached to a flange.

FIG. 5B is a partial cross-sectional view of section 5B-5B shown in FIG. 5A.

FIG. 8A is a cross-sectional view of the example embodiment connector shown in FIG. 6A connected to an example embodiment flange member.

FIG. 8B is a partial cross-sectional view of section 8B-8B shown in FIG. 8A.

FIG. 9A is an end view including a partial cross-sectional view portion of an example embodiment mixer.

FIG. 9B is a perspective view of a mixing element incorporated in the example embodiment mixer shown in FIG. 9A.

DESCRIPTION

Figure 3B:
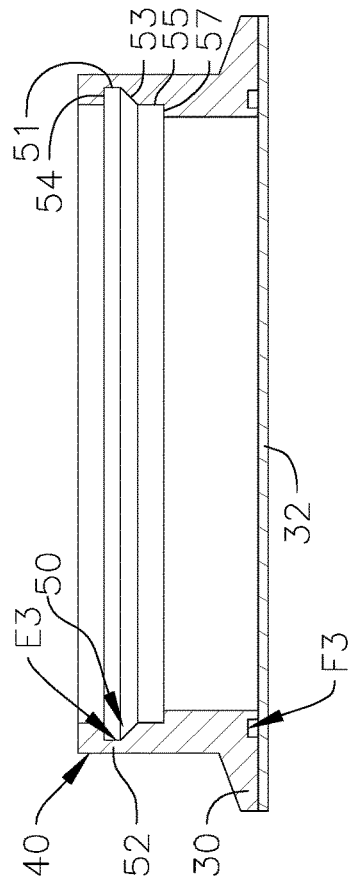
FIGS. 3A and 3B are an end view and a cross-sectional view, respectively, of a flange member incorporated in an example embodiment rehydration bag.
Figure 3D:
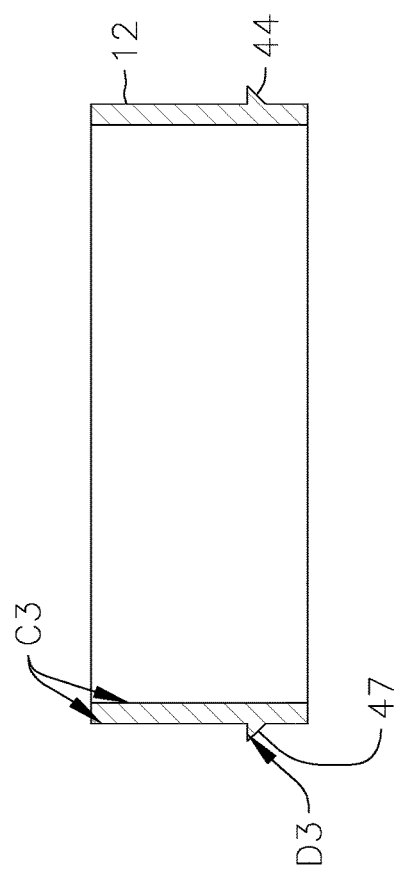
FIGS. 3C and 3D are an end view and a cross-sectional view, respectively, of an end of the mouth of an example embodiment rehydration bag.
Figure 3A:
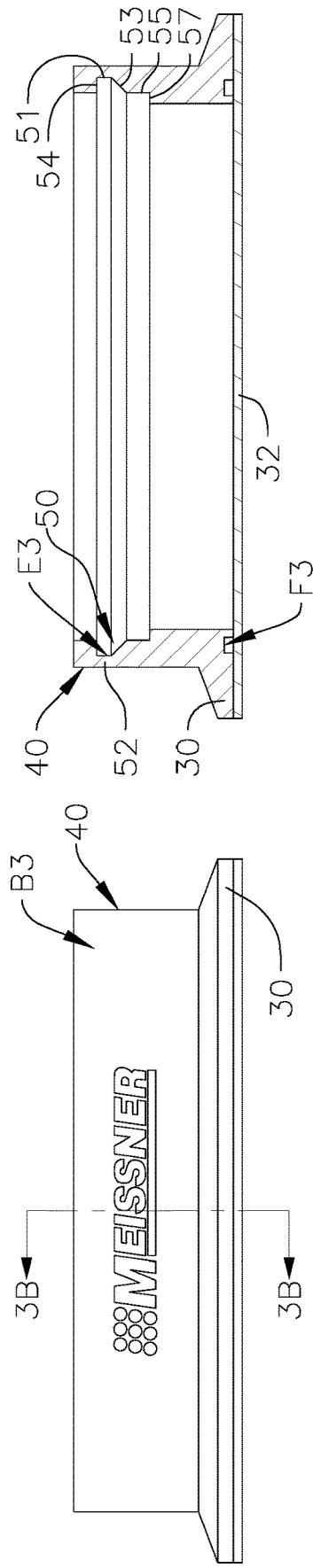
Figure 3C:
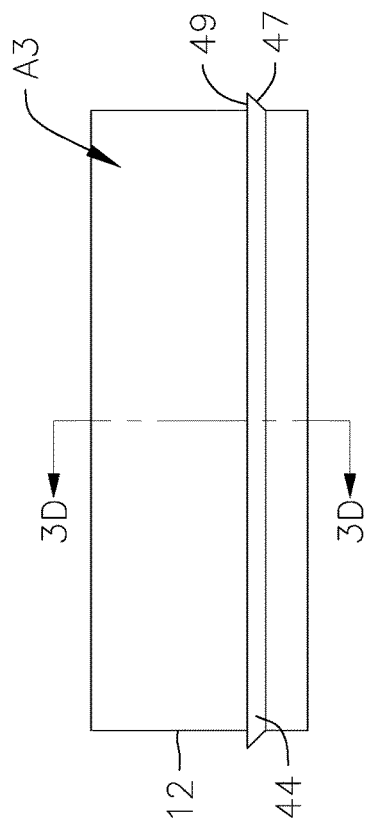

Powder transfer bags and their components, rehydration systems incorporating powder transfer bags, and methods of using the same, are disclosed herein. In an example embodiment, a powder transfer bag 10 for holding a powder material to be hydrated is disclosed in FIGS. 1A and 1E. An inflatable sealing device 16 such as balloon structure is provided to seal a mouth 12 of the bag and to retain the powder within the bag until the powder is ready to be released into a rehydration system. In an example embodiment as shown in FIGS. 1B and 1C, two inflatable members or balloons 16a, 16b are used to form the sealing device 16. In the example embodiment shown in FIG. 1B, a sealing member 20 is welded or otherwise attached across the mouth or the bag 10 at opposite ends of the sealing member. The sealing member 20 may be a rectangular plate that is welded along a diameter of the mouth and extending axially within the mouth. Two inflatable members 16a, 16b which are semi-circular in shape are positioned into the mouth 12 of the bag at a location proximate a body 17 of the bag. Each inflatable member includes a sealing surface 22 which may be linear and flat as can be seen in FIG. 1D. In an example embodiment, an inflating valve 24 extends from an end of the bag opposite the sealing surface 22. When placed into the mouth, the inflating valve penetrates an opening 26 formed on a peripheral wall 27 of the mouth, as shown in FIGS. 1B and 1E. In an example embodiment, a retaining member (not shown), such as a nut or a washer, may be placed or coupled (e.g., threaded) to the valve such that the peripheral wall 27 is sandwiched between the retaining member and the balloon. The inflatable members are positioned opposite of each other in the mouth with each valve penetrating a corresponding opening 26. The shape of each of the inflatable member is such that when inflated their sealing surfaces 22 seal along with the sealing member 20 and occupy the entire cross-sectional area perpendicular to a longitudinal axis 29 of the mouth not occupied by the sealing member 22. Both inflatable members are inflated after the bag is filled with the appropriate powder, such that their sealing surface 22 engages and seals against the sealing member 20 within the mouth. The inflated inflatable members and sealing member 20 occupy the entire cross-sectional area of the mouth thereby sealing the mouth and retaining the powder within the bag. When the powder is ready to be used, the balloons are deflated by releasing the air or gas which has inflated the balloons from their corresponding valves so that the corresponding sealing surface 22 of each inflatable member disengages from member 20, allowing the powder of the bag to drop through the mouth of the bag by gravity.

In another example embodiment, the mouth 12 of the powder bag 10 includes an annular flange 30, as shown in FIGS. 2A and 2B. A membrane 32 is welded or otherwise attached to the flange. The membrane may be thermally welded or may be attached with an adhesive. In an example embodiment, once the powder is placed within the powder bag, the membrane may be welded, or otherwise attached, over the mouth of the bag to seal the powder contents therein until the bag is ready for use. In another example embodiment the membrane may be sealed in place prior to filling with powder. Powder addition may be accomplished via a secondary port, as for example port 15, that is subsequently closed, for example, by a screw cap (FIG. 2A). In an example embodiment, the membrane has a thickness ranging from 0.010 to 0.050 and is made from materials, such as for example, thermoplastic elastomer (TPE), polyethylene, and/or polypropylene.

In yet another example embodiment as shown in FIGS. 3A, 3B, 3C, and 3D, the flange 30 is formed on a separate flange member 40 that is coupled to a mouth 12 of the bag. With this embodiment, the mouth 12 of the bag 10 is formed without a flange and includes a locking ring 44. The locking ring in an example embodiment is an annular member extending radially outward from the mouth. In other example embodiments, the locking ring may be in spaced apart sections extending from peripheral portions or a peripheral portion of the mouth. The locking ring may be made from a material that is the same or different than the material of the mouth. In another example embodiment, the locking ring is formed integrally with the mouth. In the shown example embodiment, the locking ring has a lower surface 47 that is inclined away from an open end 45 of the mouth that will be closest to the flange 30 in a radial outward direction. The locking ring also has an upper surface 49 that extends radially outward from the mouth. In the shown example embodiment, the upper and lower surfaces intersect.

In an example embodiment as shown in FIG. 3B, an internal groove 50 is formed inside an annular body wall 52 of the separate flange member 40 to accept the locking ring. The groove may be an annular groove and span the entire circumference of the flange member 40, or may span portions of the circumference of the flange member 40, as necessary, for accommodating the annular lock ring or lock ring sections 44. In an example embodiment, the groove 50 is an annular groove and has three sections, as viewed in cross-sections extending into the body wall 52. A first section 51 extends radially into the body wall 52 of the flange member 40, and defines a first annular step 54. A second tapering section 53 extends from the first section tapering from a larger diameter adjacent the first section to a smaller diameter in a direction axially away from the first section. A third section 55 extends from the second section adjacent the smaller diameter of the second section and in a direction axially away from the first and second sections. A second annular step 57 is defined by the third section facing the first annular step 54. The diameter of the third section is smaller than the diameter of the first section. In the shown example embodiment the first and third sections are constant diameter sections. In another example embodiment, the internal groove 50 may have only one section. In other example embodiments, the internal groove may have one or more sections.

With this example embodiment, the membrane member 32 is welded onto the flange 30 of the flange member 40. The flange member 40 is then slid over the mouth 12. As the flange member 40 slid over the mouth 42, the inner wall surface 56 of the flange member slides over the outer wall surface 59 of the mouth 42 and compresses or flexes the locking ring until it moves along the locking ring axially and the locking ring moves into the annular groove 50 and expands therein. The annular step 54 would prevent the flange member 40 from sliding back away from the powder bag mouth 12 past the locking ring as the locking ring would engage the should 54 preventing the flange member from sliding further away from the mouth. In this regard, after the bag is filled, the flange member with the attached membrane is slid and locked into place over the mouth 42. In another example embodiment, the locking ring is formed extending from the flange member and the annular groove in the mouth 12.

In yet another example embodiment, the membrane member 32 is formed with axial projections 60, as for example shown in FIGS. 4A, 4B and 4C. Corresponding axial depressions 62 are formed on the flange 30 of the mouth (or flange member 40) of the powder bag. Each of the projections 60, in an example embodiment, includes a tab portion 64 extending transversely therefrom, and each depression 62 includes a further or secondary side depression 68 to accept tab 64. In this regard, when the projection 60 is fitted within the depression 62, the tab portion extends and fits into the secondary side depression 68, locking the projection within the depression.

In the example embodiment as shown in FIG. 4A, where multiple projections 60 are incorporated, it is desired that the portion 70 of the membrane 32 interfacing with the flange 30 is stiffer than the membrane material itself. In this regard, a stiffer outer annular portion 70, relative to the inner portion, as shown in FIG. 4A, engages the flange 30 when the projections are received in their corresponding depressions. By having a sufficient stiffness, the outer annular portion 70 does not flex away from the flange 30 when the membrane is connected to the flange at the spaced apart locations of the projections/depressions and the weight of the powder within the bag rests against the membrane when the bag is held with its mouth facing downward. The remaining internal portion 72 of the membrane 32, which is surrounded by the annular portions 70, is less stiff and thus more flexible. This may be accomplished by making the outer annular portion 70 from a stiffer material, and attaching it, as for example by thermal welding to a softer inner portion 72 (e.g. a more pliable portion). In another example embodiment, the entire membrane, including outer annular portion 70 and inner portion 72, are made from a same material, but the inner portion 72 is made thinner and thus more flexible and the outer annular portion. In another example embodiment, instead multiple projections 60, a single annular projection extending around the entire membrane is provided and fits into a corresponding annular depression formed on the flange. With this example embodiment, it may not be necessary to make the outer annular portion 70 stiffer than the inner portion 72, as the annular projection remains engaged with the annular depression connecting the membrane around the entire flange.

In yet another example embodiment as shown in FIGS. 5A and 5B, the membrane 32 is coupled to the flange 30 by having a peripheral radial depression 82 that receives a peripheral projection 84 from the flange. In the example embodiment, a periphery 86 of the membrane 32 is defined so as to have the radial depression 82 extending into the periphery 86 and spanning the circumference of the membrane 32. In this regard, a peripheral projection 88 and a peripheral projection 90 are defined separated by the radial depression 82. In the shown example embodiment, the projection 90 is of sufficient diameter to extend radially across the entire annular interface surface 94 of the flange 30. In another example embodiment, the projection extends across on a radial portion of the annular interface surface 94 of the flange 30.

A depression 96 is formed radially in the flange to receive the projection 88 of the membrane as the projection 84 of the flange is received within the peripheral radial depression 82 of the membrane. In this regard, the membrane is placed within the flange such that the projection 84 of the flange is received within the peripheral radial depression 82 for retaining the membrane in place. In an example embodiment as shown in FIGS. 5A and 5B, the membrane projection 88 and the flange corresponding depression 96 interface along a slanted interface 98 that tapers from a larger diameter to a smaller diameter in a direction away from the flange projection 84 and membrane depression 82. In an example embodiment, the membrane may be a two-portion membrane, as for example shown in FIG. 4A having a stiffer outer annular portion surrounding a more pliable inner portion. In another example embodiment, the entire membrane has the same stiffness.

To move the membrane 32 to the flange 30, the membrane is flexed and the membrane depression 82 is aligned with the flange projection 84. When the membrane is allowed to unflex, the flange projection 84 is received in the membrane peripheral radical depression 82 mounting the membrane 32 to the flange 30. Once the membrane is in place, the bag which is sealed by membrane containing the powder, may be mounted on a rehydration system.

For the embodiments incorporating the membrane, a connector 100 may be used to connect the bag to a rehydration system. The connector 100 includes a cutting member for cutting the membrane once the powder bag is coupled to the rehydration system and it is ready for use so that the powder can enter the rehydration system from the powder bag. The connector is typically a tubular member, as for example shown in FIGS. 6A, 6C, 7A, and 7B, and it includes a flange 102 at a first end for interfacing with the flange 30 with attached membrane 32 of the bag. The flange 30 of the bag is clamped onto the flange 102 using known clamps, such as annular clamps. At a second end opposite the first end, the connector includes a flange 104 at the second end for connecting with a flange of a rehydration system. In another example embodiment the connector may have a different type of flange 106 (FIGS. 7A and 7B) instead of flange 104 for connecting with other structures. For example, the flange 106 may be of the type that allows the connector to be welded directly to a powder transfer bag or other container.

Figure 6A:
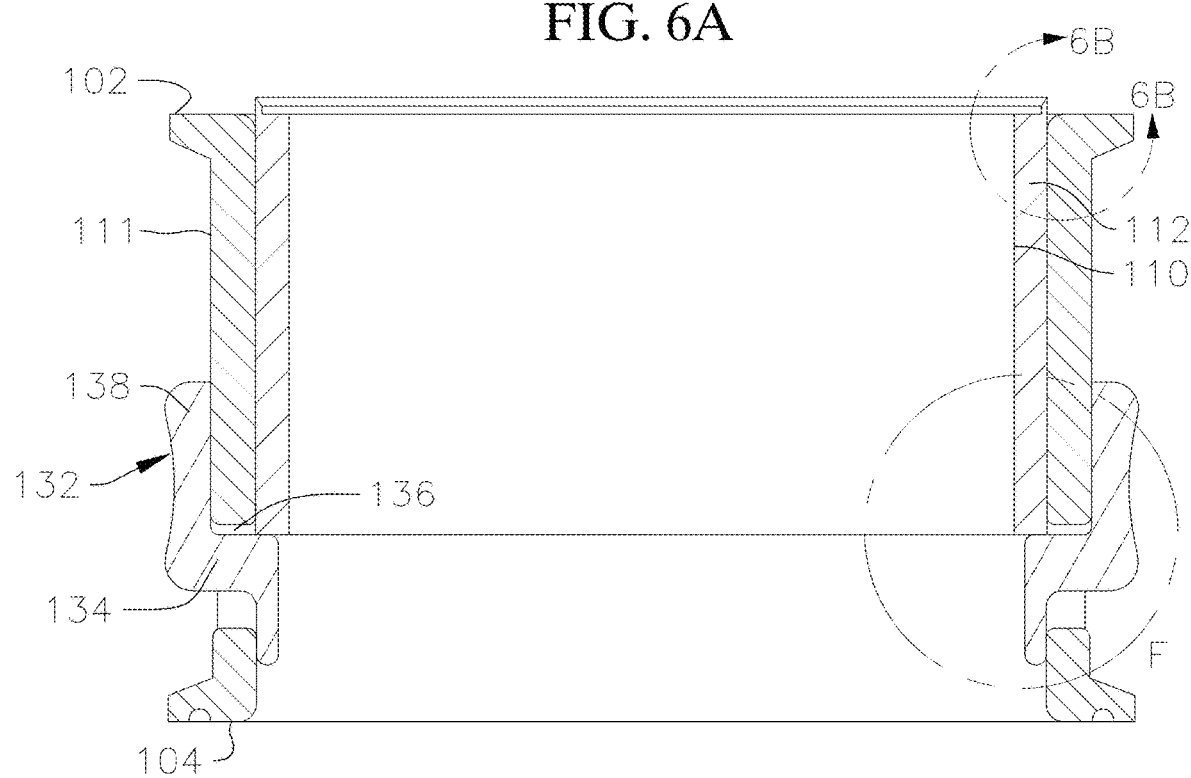
FIG. 6A is a cross-sectional view of an example embodiment connector.
Figure 6B:
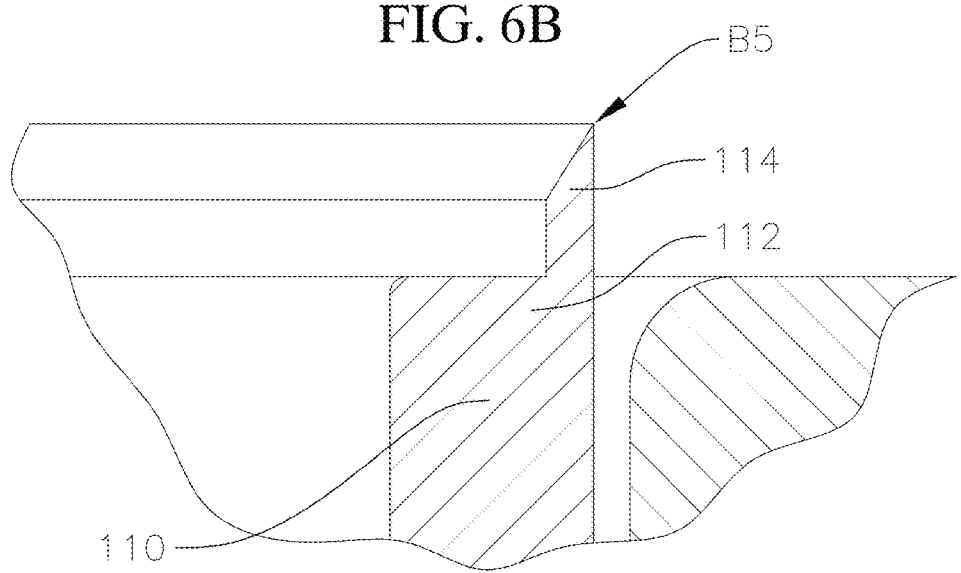
FIG. 6B is a partial cross-sectional view of section 6B-6B of the example embodiment connector.
Figure 6C:
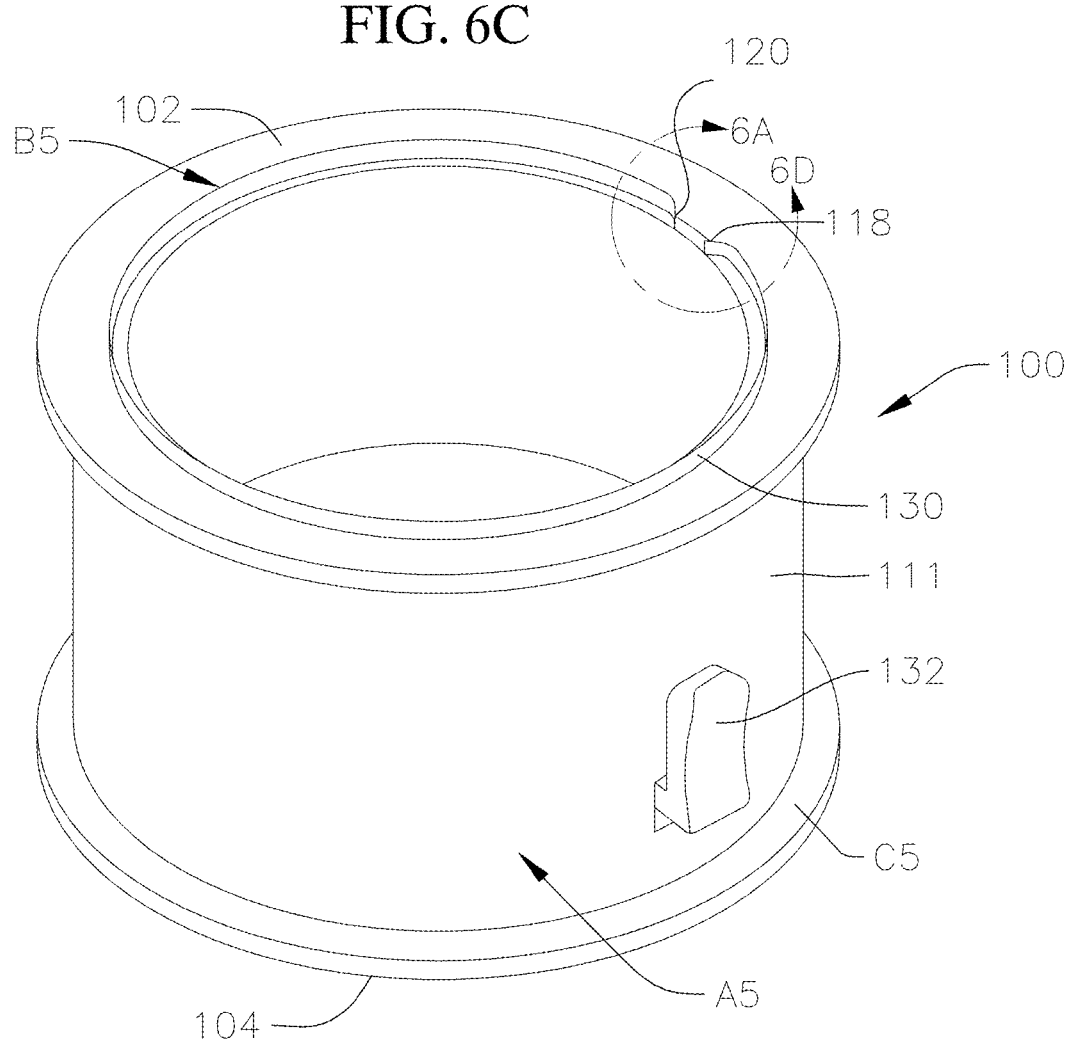
FIG. 6C is a perspective view of the example embodiment connector shown in FIG. 6A.
Figure 6D:
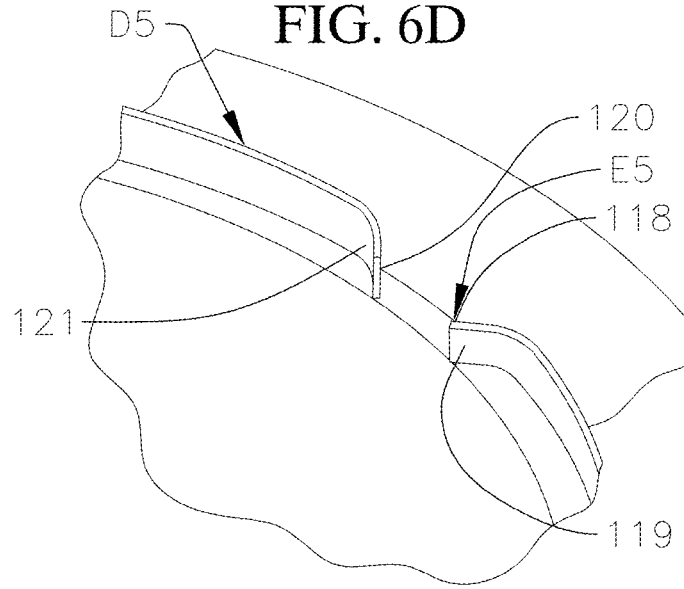
FIG. 6D is a partial perspective view of section 6D-6D of the example embodiment connector shown in FIG. 6C.
Figure 7A:
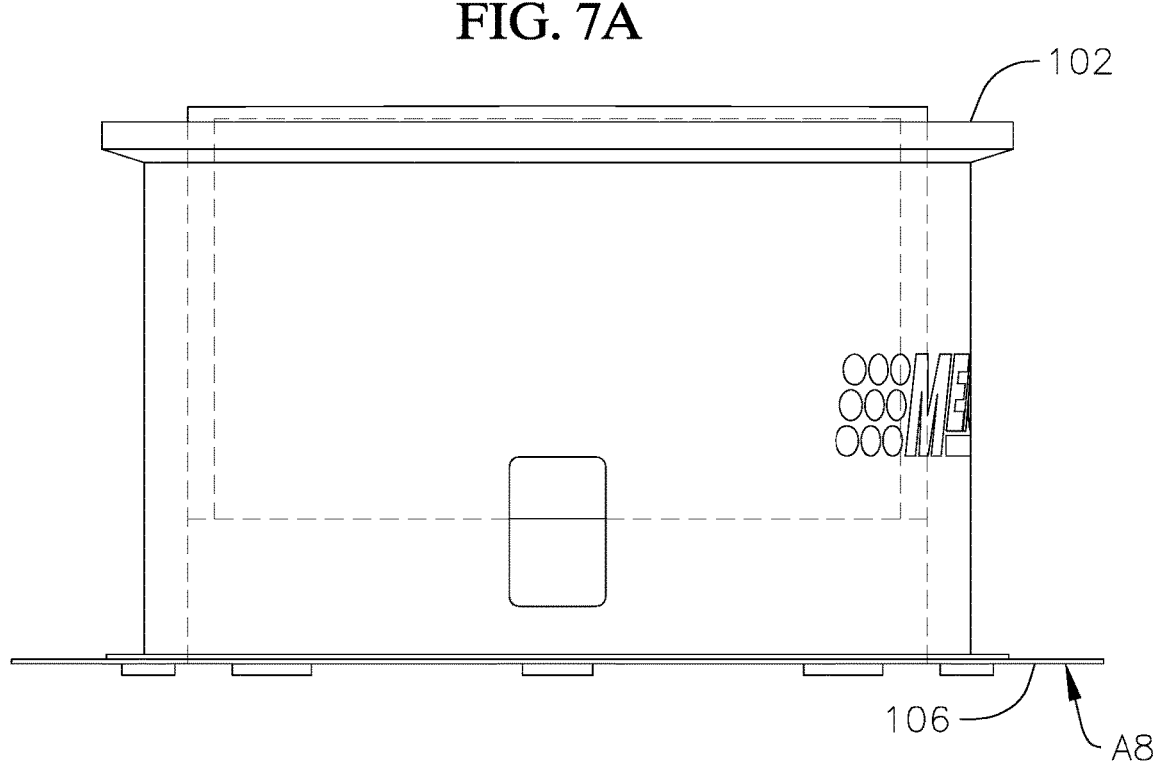
FIG. 7A is a partial cross-sectional view of another embodiment connector.
Figure 7B:
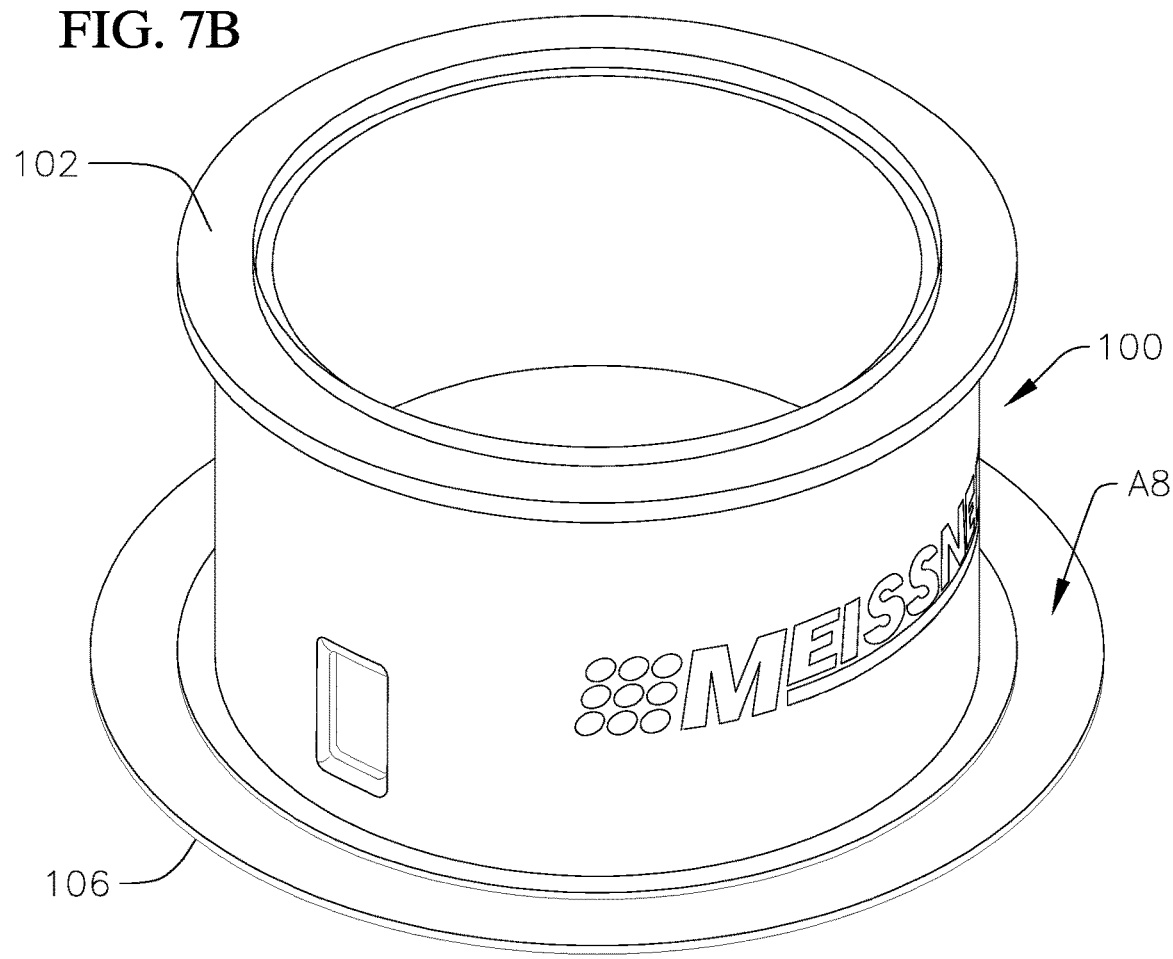
FIG. 7B is a perspective view of the example embodiment connector shown in FIG. 7A.

In an example embodiment, a cutting member 110 such as a cylindrical cutting member is slideably fitted within a cylindrical body 111 of connector 100. In the example embodiment, the cutting member includes a circumferential wall 112 from which extends a blade 114 (FIGS. 6A and 6B). In an example embodiment, the blade 114 is a circumferential blade but does not span the entire circumference of the cutting member 110 (FIGS. 6C and 6D). As can be seen in FIGS. 6C and 6D, the blade begins at a first location 118, and ends at a second location 120, proximate and spaced part from the first location 118. In an example embodiment, the height of the blade is highest at the second location 120, and lowest at the first location 118. The cutting member is slidable within the connector 100. Thus, when the bag is connected to a connector 100, in order to cut the membrane 30, the cutting member 110 is slid upwards relative to the connector body. As the member is slid upwards, the highest portion of the blade contacts the membrane first and as the membrane cutting member is continuously slid upwards, the cutting member continues to circumferentially cut along the circumference of the membrane beginning at a location 120 of the blade, and ending at a location 118, spaced apart from the location 120.

As can be seen in the example embodiment shown in FIG. 6D, ends of the blades 119 and 121 at location 118 and 120, respectively, curve radially inward. In this example embodiment, this is done so as that the end points of the cut on the membrane do not extend towards each other. This would prevent, or decrease, the chance of the membrane being completely cut and falling into the rehydration system. If the ends of the cut of the membrane extend towards each other, there is a possibility that the cut will further extend along each end towards the other end, such that the membrane is completely cut and thus separate from the body.

In another example embodiment, the highest portion of the blade may be at 118 and at 120, and the lowest portion may be at a different location, as for example at a location 130, opposite ends 118 and 120, or the highest points may be at 118 and 120, and the lowest points at 130. In other example embodiments, two or more spaced apart arcuate blades are formed which would cut spaced apart portions of the member.

To facilitate the sliding of the cutting member relative to the connector body 111, tabs 132 extend from the cutting member through the connector 100 and can be slid upwards for sliding the cutting member upwards. The tabs are connected to the cutting member 110, and in the example embodiment shown in FIG. 6A, include a generally horizontal potion 134 extending radially outward from the cutting member and through an opening 136 through the body 111 of the connector and a generally vertical portion 138 extending from the generally horizontal portion 134.

A single member or multiple members 132 may be connected to the cutting member. In the shown example embodiment, two opposite members 132 are connected to the cutting member.

In an example embodiment, as shown in FIGS. 8A and 8B, an annular depression 140 is formed on a radially inner portion of the flange 30 for receiving the blade 114 of the cutting element. This allows the blade 114 to cut through the membrane 32 and enter into depression 114, as the blade is slid towards the membrane. In another example embodiment, cutting element 111 is aligned so as to move along an inner surface 142 of the mouth of the bag (FIG. 8B). In this regard, the depression 140 may not be required.

To facilitate mixing in a rehydration system, a mixer is provided, as shown in FIGS. 9A and 9B. The mixer 150 includes a mixing element 152, such as a static mixer within a tubular body portion 155 of the mixer. Static mixers are known in the art. Example manufacturers of static mixers include Koflo Corporation, Sulzer, and Nordon Corporation. In an example embodiment, the mixing element 152 may be integrally formed within the tubular body portion 155. The mixer also includes a funnel portion 154. The funnel portion is connected to or is formed integrally with the tubular body portion 155 such that the flow through the funnel portion is generally perpendicular to a flow path 156 along a longitudinal axis 157 of the tubular body portion. In the shown example embodiment, the mixer is shown with a connector 100 integrally formed with the mixer funnel portion 154. In other example embodiments, the connector may be a separate member that is connected or clamped to the mixer funnel portion. With such an embodiment, a flange 104, 106 (or other type of connectors) of the connector is clamped or otherwise connected to a flange of the mixer funnel portion.

A powder bag containing the powder, such as a bag containing the powder sealed as discussed with any of the aforementioned embodiments is mounted onto to the connector flange 102 and is in-line with a funnel portion 154 of the mixer. As the powder from the fluid bag flows into the tubular body, a hydrating liquid flows along the flow path 156 carries the powder through the static mixer 152 within the tubular body portion 155 to mix the powder with the liquid, such as water, to hydrate the powder. With this example embodiment, a pump is placed downstream of the powder so as to draw the liquid and the powder through the mixing element 152 within the tubular body portion 155. However, in another example embodiment, the pump may be placed upstream of the powder so as to push the liquid through the tubular body portion along flow path 156.

Figure 10:
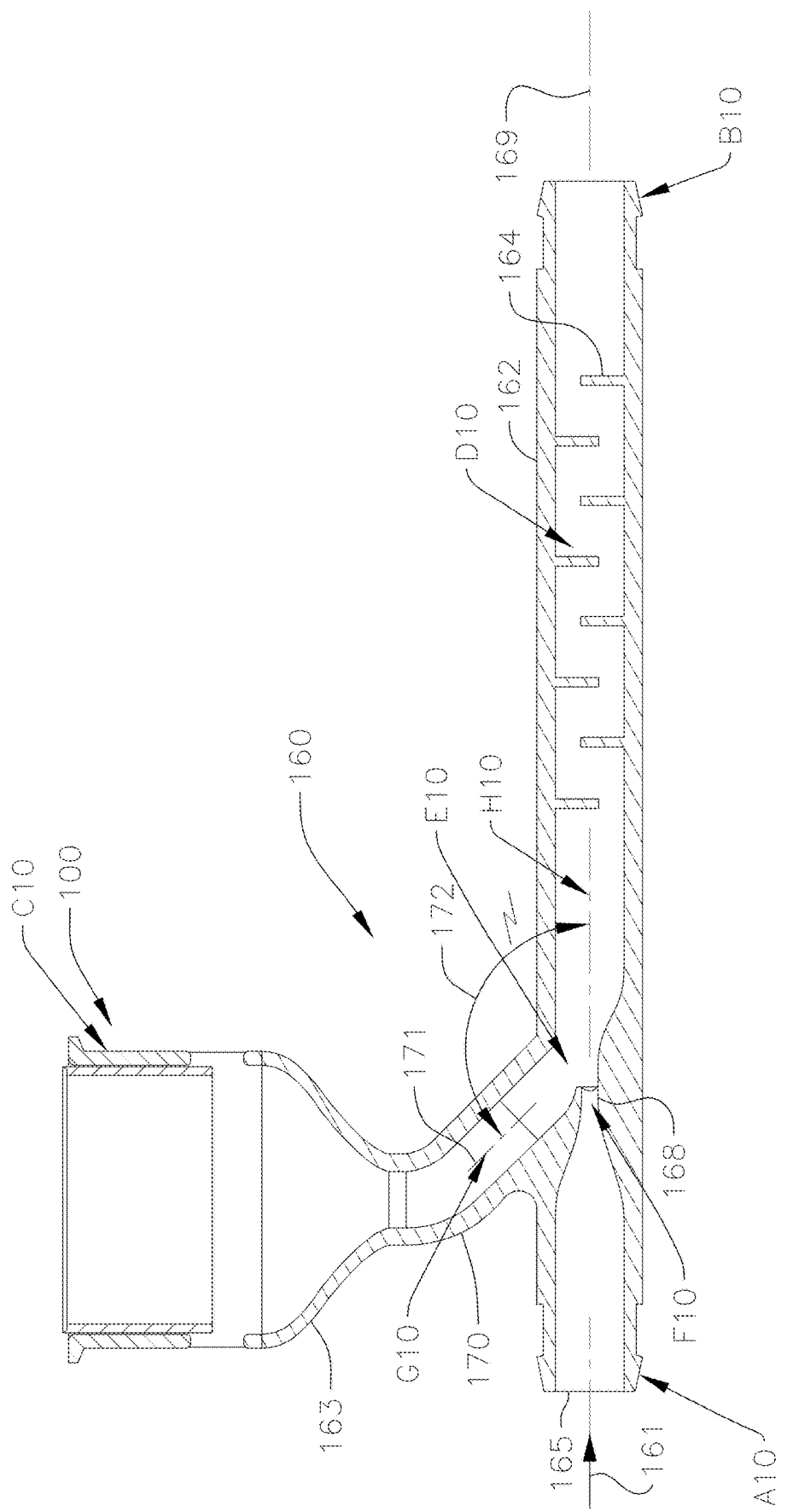
FIG. 10 is a cross-sectional view of another example embodiment mixer.

In yet another example embodiment, as shown in FIG. 10, a mixer 160 having a tubular body portion 162 and a static mixing element 164 within the tubular body portion is used.

In another example embodiment, the mixing element 164 is integrally formed within the tubular body portion 162. The mixer also includes a funnel portion 163. The funnel portion is connected to or is formed integrally, with a port 170 extending transversely from the tubular body portion 162. In the shown example embodiment, the mixer is shown with a connector 100 integrally formed with the mixer funnel portion 163. In other example embodiments, the connector may be a separate member that is connected or clamped to the mixer funnel portion. With such an embodiment, a flange 104, 106 of the connector (or other type of connectors) is clamped (or otherwise connected) to a flange of the mixer funnel portion.

A powder bag containing the powder, such as a bag containing the powder sealed as discussed with any of the aforementioned embodiments is mounted onto to the connector flange 102. The first tubular body portion receives fluid flow from an inlet 165 along a fluid flow path 161. A restrictor 168 is defined within the fluid flow path of the tubular body. The restrictor may be integrally formed within the first tubular member or may be a separate member within the first tubular member. In the shown example embodiment, the restrictor is a venturi. The restrictor causes an acceleration of the fluid flow and an increase in the flow pressure. In another example embodiment, the restrictor is variable, e.g., the cross-sectional area of the restrictor may be varied, such that the flow rate through the restrictor may be changed. The restrictor also controls the powder flow rate. Less restriction leads to greater fluid flow and decreases powder flow rates, while more restriction leads to less fluid flow and increases powder flow rates. The port 170 extends from the tubular portion downstream of the restrictor 168. With this example embodiment, a pump is placed downstream of the powder so as to draw the liquid and the powder through the mixing element 164 within the tubular body portion 162. However, in another example embodiment, the pump may be placed upstream of the powder so as to push the liquid through the tubular body portion along flow path 167 along a longitudinal axis 169 of the tubular body.

As the powder from the powder bag is released, it flows through the port 170 as liquid such as hydration liquid is drawn through the inlet 165 and is accelerated and through the restrictor and mixed with the powder which then gets mixed by the static mixer 164. The accelerated fluid flow and the increase in pressure caused by the restrictor further aid in the mixing and the hydration of the powder with the liquid. To aid in the flow of powder, the port is angled. In one example embodiment, the port longitudinal axis 171 is at an angle at an angle 172 of about 45 degrees relative to the tubular body longitudinal axis 169. By the port longitudinal axis being at an angle, the port provides for enhanced powder flow while mitigating the possibility of fluid getting into the powder delivery channel.

Figure 11:
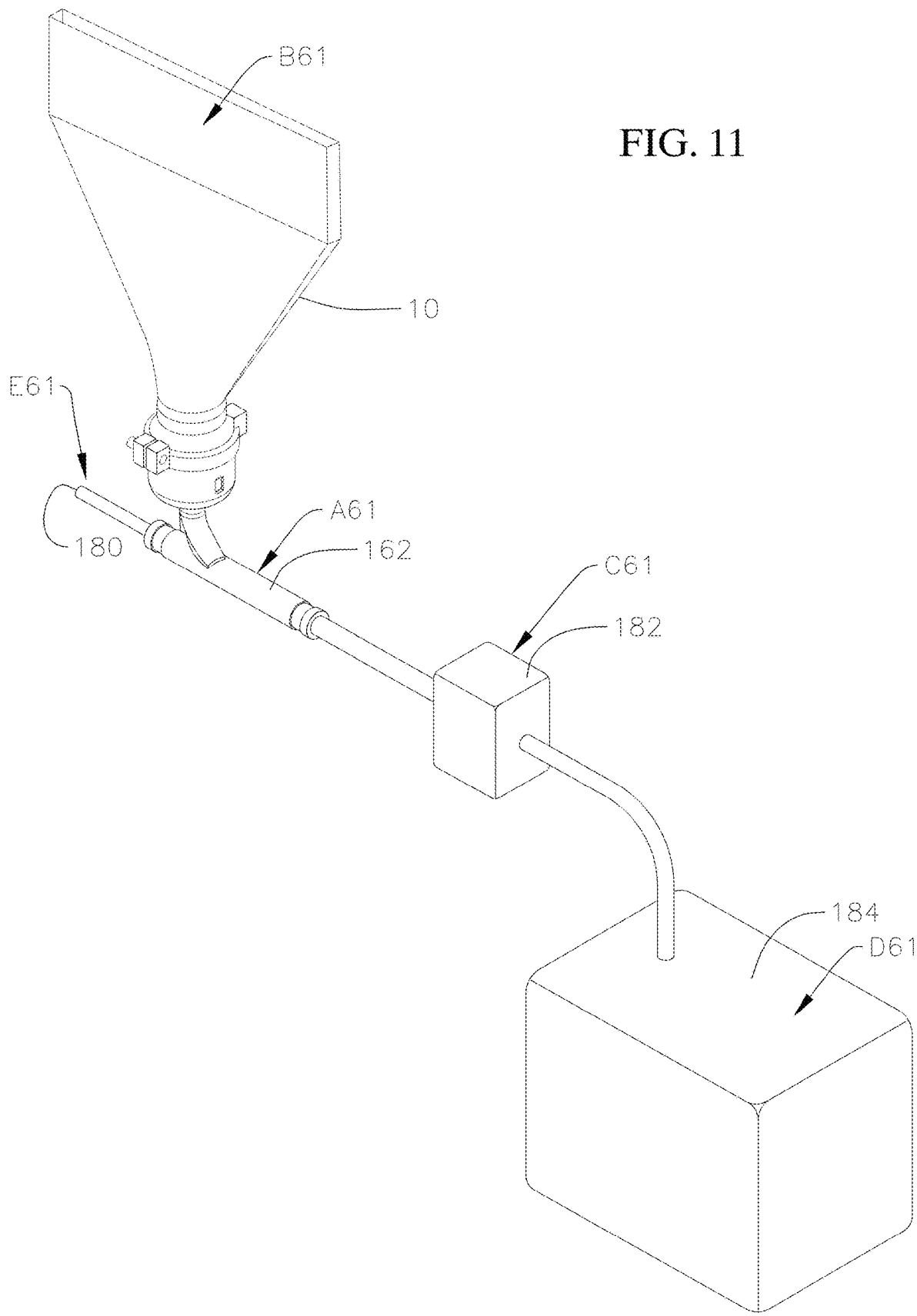
FIG. 11 is a perspective schematic view of an example embodiment rehydration system.

Any of the mixers, as for example the mixer shown in FIG. 9 or 10 may be placed in a flow system where flow is introduced at one end, as for example shown in FIG. 11. More specifically, liquid flow is introduced at an inlet 180. The mixer 160 (or the mixer 150) which is downstream of the inlet 180 receives the liquid flow as well as the powder from powder bag 10. A pump 182 is downstream from the mixer and draws the powder as well as the liquid flow into a biocontainer 184.

Figure 12:
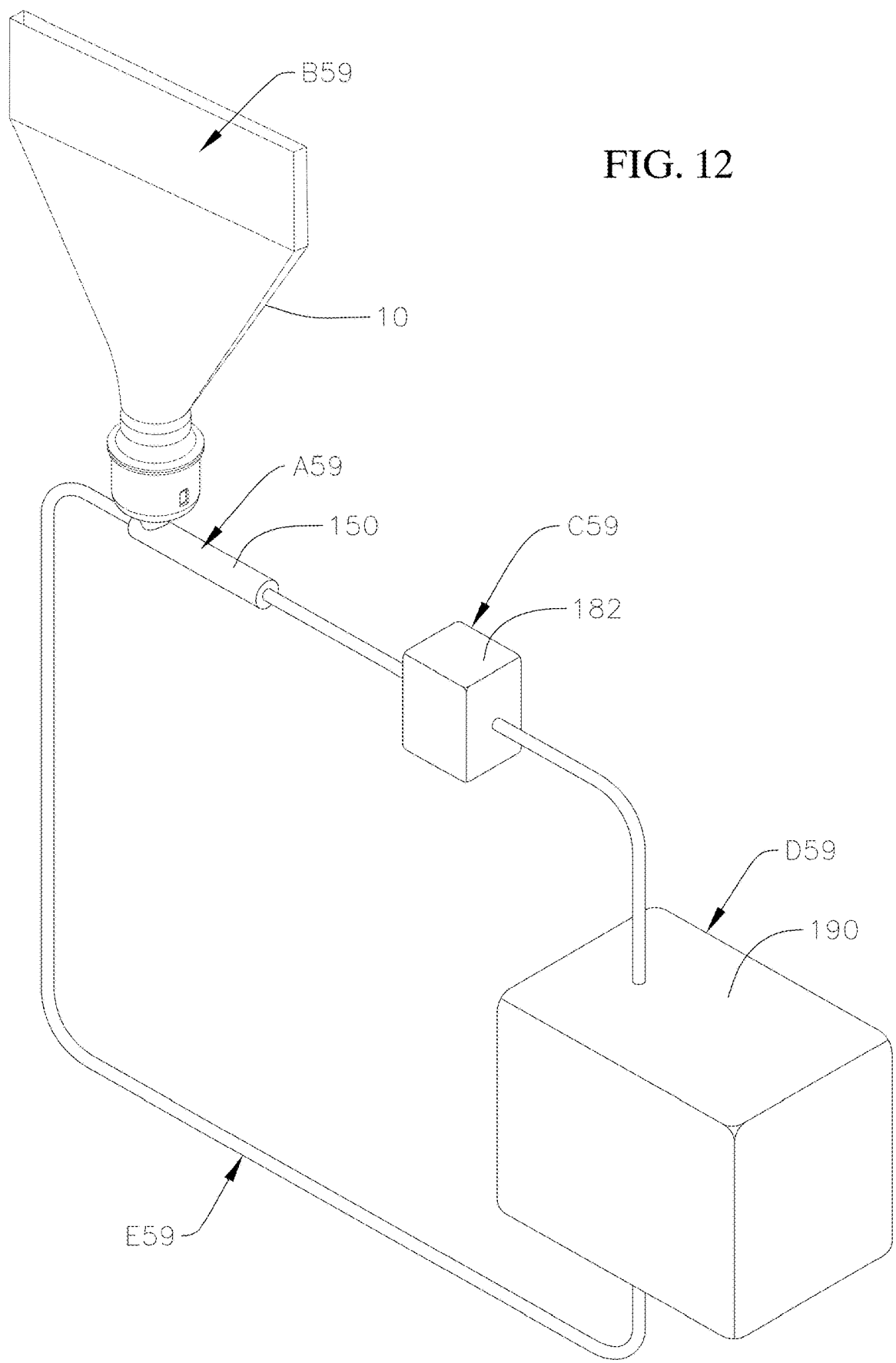
FIG. 12 is a perspective schematic view of another example embodiment rehydration system.

In another example embodiment, the pump may be upstream of the powder introduction point. The hydrated powder flows into biocontainer 184. In another example embodiment, as for example shown in FIG. 12, the liquid including the powder may be circulated multiple times. With this embodiment, a mixer as for example a mixer 160 (or a mixer 150) is coupled to a biocontainer 190. The biocontainer may already include the appropriate hydrating liquid, such as water. The hydrating liquid in one example embodiment is stored in a biocontainer 184. A pump 182 downstream of the mixer 160 (150) causes the liquid from the biocontainer to be drawn and circulate through the mixer 160 (150) and to draw the powder through the powder bag 10 into the mixer and mix it. The process continues circulating the powder and liquid through the mixer until appropriate mixing has occurred.

It should be understood that the bags in other example embodiments may store other materials besides powder materials.

It should be noted that the terms "upper", "lower", "above", and "below" are used herein for illustrative purposes to illustrate relative portions. For example, a lower surface of an object may be higher from an upper surface of the object when the object is turned upside down.

While the invention has been described with respect to a limited number of embodiments, those skilled in the art, having benefit of this disclosure, will appreciate that other embodiments can be devised which do not depart form the scope of the invention as disclosed herein. The invention is also defined in the following claims.

What is claimed is:

1. A connector comprising:
   an annular body having a first end opposite a second end, and an annular inner surface extending along a circumference and axially between the first end and the second end;
   a first flange defined at the first end of the annular body for coupling with a reservoir; and
   a cutting element within the annular body, said cutting element having a cutting edge configured for cutting into the reservoir, said cutting edge extending adjacent said circumference along a circumferential path and allowing for flow of any content within the reservoir within said circumferential path, wherein said cutting element slides along an axis of the annular body relative to the annular body between a first location and a second location, wherein when at the first location, the cutting edge is at a first position, and when at the second location, the cutting edge is at a second position external of the annular body and beyond the first flange for cutting along said circumferential path into the reservoir, and wherein the first position is axially spaced from the second position.

2. The connector of claim 1, wherein the first flange extends radially beyond the annular body.

3. The connector of claim 1, further comprising a second flange defined at the second end for coupling with another device for receiving said content.

4. The connector of claim 3, wherein the second flange extends radially beyond the annular body.

5. The connector of claim 1, wherein the cutting element comprises a blade extending along said circumferential path.

6. The connector of claim 5, wherein the blade comprises said cutting edge, wherein a height of said cutting edge varies along said circumferential path relative to said first flange.

7. The connector of claim 6, wherein said height varies linearly along at least a majority of said circumferential path from a minimum height to a maximum height.

8. The connector of claim 5, wherein an end of said blade curves radially inward.

9. The connector of claim 1, further comprising a tab coupled to the cutting element for sliding the cutting element between the first and second locations.

10. The connector of claim 1, wherein, the blade extends adjacent along majority of the circumference and wherein opposite ends of said blade curve radially inward.

11. The connector of claim 1, wherein the blade extends adjacent substantially along the entire circumference.

12. The connector of claim 1, wherein when at the first position, the cutting edge does not extend beyond the first flange.

13. A connector comprising;
   an annular body having an annular inner surface extending along a circumference defining a flow path;
   a first flange at a first end of the annular body; and
   a cutting element within the annular body, said cutting element having a cutting edge, said cutting edge extending adjacent said circumference along a circumferential path, wherein said cutting element slides along an axis of the annular body relative to the annular body between a first location and a second location, wherein when at the first location, the cutting edge is at a first position, and when at the second location, the cutting edge is at a second position external of the annular body and beyond the first flange for cutting along said circumferential path, and wherein the first position is axially spaced from the second position.

14. The connector of claim 13, wherein the first flange extends radially beyond the annular body.

15. The connector of claim 13, further comprising a second flange extending from a second end of the annular body opposite the first end of the annular body.

16. The connector of claim 15, wherein the second flange extends radially beyond the annular body.

17. The connector of claim 13, wherein the cutting element comprises a blade extending along said circumferential path.

18. The connector of claim 17, wherein the blade comprises said cutting edge, wherein a height of said cutting edge varies along said circumferential path relative to said first flange.

19. The connector of claim 18, wherein said height varies linearly along at least a majority of said circumferential path from a minimum height to a maximum height.

20. The connector of claim 13, wherein an end of said blade curves radially inward.

21. The connector of claim 13, wherein the blade extends adjacent substantially along the entire circumference.

22. The connector of claim 13, further comprising a tab coupled to the cutting element for sliding the cutting element between the first and second locations.

23. The connector of claim 13, wherein when at the first position, the cutting edge does not extend beyond the first flange.

* * * * *